(12) United States Patent
Berretty et al.

(10) Patent No.: US 9,256,926 B2
(45) Date of Patent: Feb. 9, 2016

(54) USE OF INPAINTING TECHNIQUES FOR IMAGE CORRECTION

(75) Inventors: Robert-Paul Mario Berretty, Eindhoven (NL); Jose Pedro Magalhaes, Utrecht (NL); Reinier Bernardus Maria Klein Gunnewiek, Eindhoven (NL); Bart Gerard Bernard Barenbrug, Eindhoven (NL); Ling Shao, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1018 days.

(21) Appl. No.: 13/055,727

(22) PCT Filed: Jul. 22, 2009

(86) PCT No.: PCT/IB2009/053167
§ 371 (c)(1),
(2), (4) Date: Jan. 25, 2011

(87) PCT Pub. No.: WO2010/013171
PCT Pub. Date: Feb. 4, 2010

(65) Prior Publication Data
US 2011/0123113 A1    May 26, 2011

(30) Foreign Application Priority Data
Jul. 28, 2008   (EP) .................................... 08161240

(51) Int. Cl.
*G06K 9/46*    (2006.01)
*G06T 5/00*    (2006.01)
(Continued)

(52) U.S. Cl.
CPC ................ *G06T 5/005* (2013.01); *H04N 19/17* (2014.11); *H04N 19/86* (2014.11)

(58) Field of Classification Search
CPC .... G06K 9/43; G06T 5/005; H04N 19/00909; H04N 19/0026
See application file for complete search history.

(56) References Cited

U.S. PATENT DOCUMENTS

| | | |
|---|---|---|
| 5,590,653 A | 1/1997 | Aida et al. |
| 6,668,097 B1 | 12/2003 | Hu et al. |

(Continued)

FOREIGN PATENT DOCUMENTS

| | | |
|---|---|---|
| WO | 2004039086 A2 | 5/2004 |
| WO | 2007099465 A2 | 9/2007 |

(Continued)

OTHER PUBLICATIONS

Y. Wexler et al; "Space-Time Video Completion" Proc. of the 2004 IEEE Computer Society Conference on Computer Vision and Pattern Recognition (CVPR 2004), 1, 2004.

(Continued)

*Primary Examiner* — Chan Park
*Assistant Examiner* — Elisa Rice

(57) ABSTRACT

A method of processing an image signal comprising image and depth information is provided. The method is configured to perform segmentation on an image based on depth/disparity information present in the image signal comprising said image, and subsequently inpaint background for correction of the errors in the image around the foreground objects into a region that extends beyond the segment boundary of the foreground object and/or inpaint foreground for correction of errors in the image into a region that extends inside the segment boundary of the foreground object. In this way compression and other artifacts may be reduced.

25 Claims, 4 Drawing Sheets

(51) Int. Cl.
*H04N 19/17* (2014.01)
*H04N 19/86* (2014.01)

(56) References Cited

U.S. PATENT DOCUMENTS

| | | |
|---|---|---|
| 2004/0103477 A1 | 6/2004 | Gagnon et al. |
| 2005/0080333 A1 | 4/2005 | Piron et al. |
| 2007/0280551 A1 | 12/2007 | Oztan et al. |
| 2009/0016640 A1 | 1/2009 | Gunnewiek |

FOREIGN PATENT DOCUMENTS

| | | |
|---|---|---|
| WO | 2009001255 A1 | 12/2008 |
| WO | 2009047681 A1 | 4/2009 |
| WO | 2009093185 A2 | 7/2009 |

OTHER PUBLICATIONS

Ching-Yi Chen et al; "Hardware-Oriented Image Impainting for Perceptual I-Frame Error Concealment", Circuits and Systems, 2008, ISCAS 2008, IEEE INTNL Symposium O, IEEE Piscataway, NY, May 18, 2008, pp. 836-839, XP031392103.

Vijay Venkatesh N. et al; "Efficient Object-Based Video Inpainting" Pattern Recognition Letters, Elsevier, Amsterdam, NL, vol. 30, No. 2, Mar. 30, 2008, pp. 168-179, XP025676649.

Oliver Wang et al; "Automatic Natural Video Matting With Depth", Computer Graphics and Applications, 2007, PG '07, 15th Pacific Conf. on IEEE, Piscataway, NJ, Oct. 29, 2007, pp. 469-472, XP0311338482.

K. Ni et al; "Matting Through Variational Inpainting", Proceedings of the 9th IASTED Intl Conf. on Signal and Image Proc, SIP 2007, pp. 179-184, XP007909996.

P. Bourdon et al; "Transmission and Quantization Error Concealment for JPEG Color Images Using Geometry-Driven Diffusion", Image Proc., 2005, ICIP 2005, IEEE Intnl Conf. on Genova, IT, Sep. 11, 2005, Piscataway, NJ, vol. 1, pp. 801-804, XP010850871.

Selim Esedoglu et al; "Digital Inpainting Based on the Mumford-Shah-Euler Image Model".

Zinovi Tauber et al; "Review and Preview: Disocclusion by Inpainting for Image-Based Rendering", Dept. of Computing Science in Simon Fraser Univ., British Columbia, CA.

Chris Varekamp; "Compression Artifacts in 3D Television Signals", Philips Research, Eindhoven, NL.

USE OF INPAINTING TECHNIQUES FOR IMAGE CORRECTION

FIELD OF THE INVENTION

This invention pertains in general to the field of digital imaging. More particularly the invention relates to inpainting for correction of artifacts in an image or image sequence.

BACKGROUND OF THE INVENTION

Inpainting is the process of reconstructing lost or deteriorated parts of images and videos. For instance, in the case of a valuable painting, this task would be carried out by a skilled image restoration artist. In the digital world, inpainting, also known as image interpolation or video interpolation, refers to the application of sophisticated algorithms to recover lost or corrupted parts of the image data.

Creating depth by annotation-and-propagation is the process of drawing a depth map for one image frame in an image sequence, i.e. annotating it, and then utilizing software tracking of the annotated objects to propagate the depth to the next/previous frames in the image sequence. This is a known method of semi-automated depth creation. Estimated depth information, independently of its source, is typically plagued with problems such as real object boundary misalignment.

FIG. 1a illustrates an image comprising an object, in which the depth misalignment with objects is noticeable as indicated by the bright areas protruding at the top and bottom beyond the dark area. FIG. 1a shows the depth component overlaid over luminance. This depth misalignment is due to the fact that a small portion of the foreground object is incorrectly considered background. Generally misalignment occurs between at least two signals/data, such as depth component and video data.

When compressing 2.5D videos utilizing commonly known lossy video compression schemes, artifacts surrounding objects are introduced. 2.5D (two-and-a-half dimensional) is an informal term used to describe a representation where a 2D image is accompanied by a depth map, which indicates the depth of each element in the 2D image.

Some artifacts caused by video compression are mosquito noise, Gibbs effect and overshoot/undershoot artifacts. FIG. 1b illustrates that halos are created around objects utilizing such lossy video compression schemes. This may occur both in 2D images or 2D videos.

The above-mentioned artifacts will generally result in noticeably decreased image quality, but they will also interfere with any subsequent video processing task, such as multi-view rendering from such a 2.5D representation.

Hence an improved method, processing unit, and computer program product allowing for removal of artifacts around objects caused by video compression, and/or correction of image data, which is misaligned with reference to depth maps when a small portion of the foreground object is incorrectly considered as background would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a method, processing unit, and computer program product according to the appended patent claims.

According to an aspect a method of processing an image signal comprising image and depth information is provided. The method comprises performing foreground/background segmentation on an image comprised in said image signal based on the depth or disparity component of said image signal, resulting in a foreground mask and a background mask. The method further comprises creating an area around a segmentation transition in said segmented image, wherein said area is likely to comprise artifacts. Moreover, the method comprises performing foreground/background dependent processing on the pixel data in the area, resulting in a processed image.

In another aspect a processing unit for processing an image signal comprising image and depth information is provided. The processing unit is configured to perform foreground/background segmentation on an image comprised in said image signal based on the depth or disparity component of said image signal, resulting in a foreground mask and a background mask. The processing unit is further configured to create an area adjacent to a segmentation transition in said segmented image, wherein the area comprises artifacts. Moreover, the processing unit is configured to perform foreground/background dependent processing on the pixel data in the area, resulting in a processed image.

In an aspect a computer program product stored on a computer-readable medium comprising software code adapted to perform the steps of the method according to some embodiments when executed on a data-processing apparatus is provided.

An idea according to some embodiments is to process video or image data for correction of coding artifacts and depth misalignment in an image.

An idea according to some embodiments is to provide a method that reduces compression artifacts surrounding objects e.g. in 2.5 D videos.

Moreover, an idea according to some embodiments is to provide a method dealing with depth information misaligned with the boundaries of real objects in image and depth representations. This problem is encountered when rendering 3D content represented in the so-called image and depth format, often used in image based rendering.

The method may also solve the problem of noisy areas around objects typically caused by video compression.

The method according to some embodiments be utilized for processing an image signal comprising image and depth information. The method is configured to perform segmentation on an image based on depth/disparity information present in the image signal comprising said image, and subsequently inpaint background for correction of the errors in the image around the foreground objects into a region that extends beyond the segment boundary of the foreground object and/or inpaint foreground for correction of errors in the image into a region that extends inside the segment boundary of the foreground object. In this way compression and other artifacts may be reduced.

BRIEF DESCRIPTION OF THE DRAWINGS

These and other aspects, features and advantages of which the invention is capable of will be apparent and elucidated from the following description of embodiments of the present invention, reference being made to the accompanying drawings, wherein like numerals are used to indicate like elements or functions and in which.

DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

The following description focuses on embodiments of the present invention applicable to digital imaging and in particular to a method for image and depth correction using inpainting. However, it will be appreciated that the invention is not limited to this application but may be applied to many other applications.

An idea according to some embodiments is to provide a method taking advantage of the depth information of an image or video to perform a background/foreground segmentation, and inpainting techniques for correction of errors around the boundaries of the segmented object. In many cases when compression is involved the depth maps have been generated semi-automatically. As such the segmentation is human steered and therefore of high quality. Furthermore, artifacts will especially be visible at object boundaries, which are indicated by depth/disparity transitions; therefore segmentation steered by depth/disparity maps is advantageous.

Figure 3:
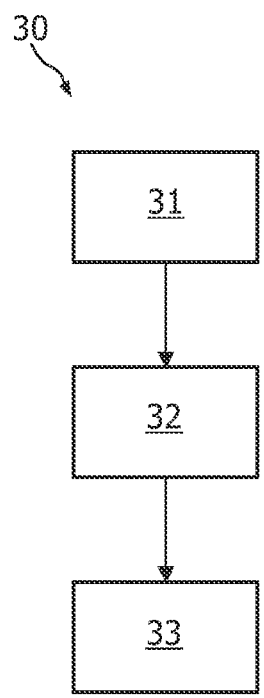
FIG. 3 is a flow chart showing a method according to an embodiment.

In an embodiment, according to FIG. 3, a method of processing an image signal comprising image and depth information is provided. The method comprises:

performing 31 foreground/background segmentation on an image comprised in said image signal based on the depth or disparity component of said image signal, resulting in a foreground mask 23, resulting in a segmented image comprising at least a foreground object 23 and a background area 22, creating 32 an area 24 adjacent to a segmentation transition, also referred to as segmentation edge, in said segmented image, the area 24 potentially comprising artifacts 26 such as compression artifacts 26 or depth misalignment 25, and performing 33 foreground/background dependent processing on the pixel data in the area 24, resulting in a processed image.

Figure 2:
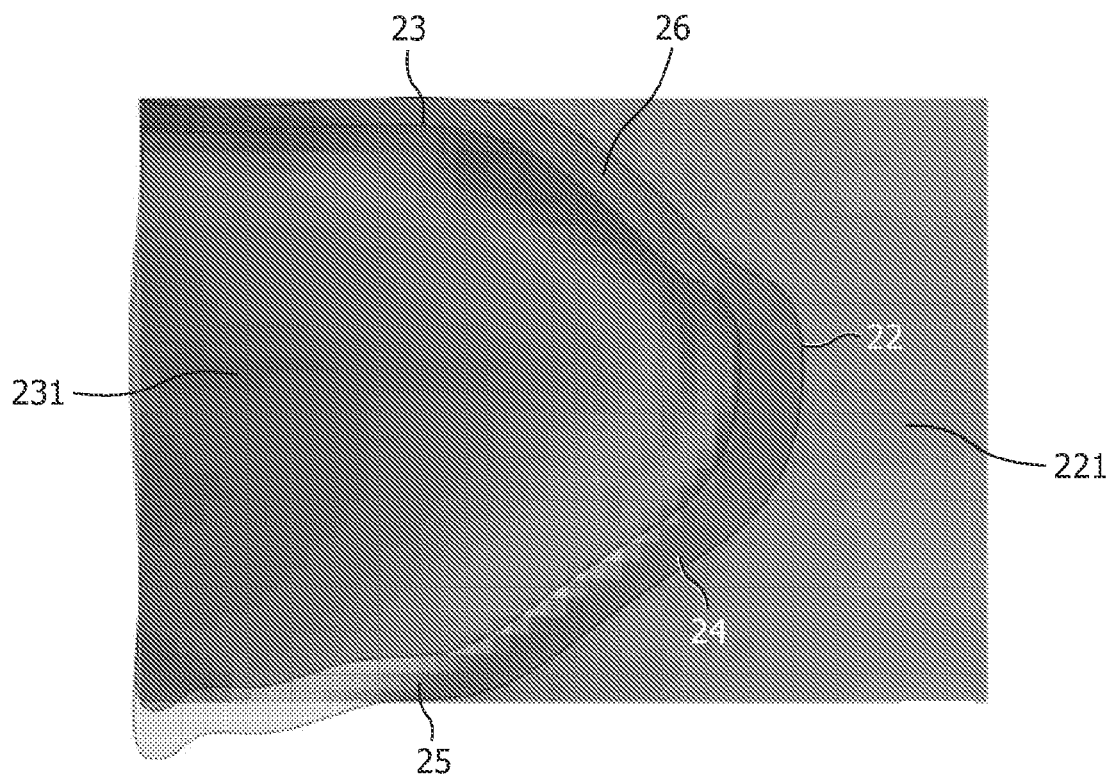
FIG. 2 illustrates an image comprising a foreground mask 23, area 24, background mask 22, after being processed by some steps of the method according to an embodiment.

FIG. 2 illustrates an image comprising a foreground object 231 and background area 221 after being processed by steps 31 and 32 of the method, in which the resulting foreground mask 23 and background mask 22 from the foreground/background segmentation, is shown. In this case, the area 24 is created outside the foreground object 231 and inside the background area 22. The artifacts, such as compression artifacts 26 and depth misalignment artifacts 25 are indicated within the area 24.

31) Forward/Background Segmentation

In some embodiments, the image segmentation technique utilized in the step of performing image segmentation may be performed as follows.

In order to know where to perform the forward/background dependent processing, this information is something that is typically supplied as input to the image-processing algorithm. In case of the method according to some embodiments the problem area potentially comprising artifacts may be automatically located based on depth transitions, whereby large depth discontinuities are indicative of an edge between foreground and background.

However, the role of such image segmentation for locating the problem area is twofold: not only is it needed to know where to perform subsequent image processing for correcting artifacts, but it is also required to know which parts of a scene are foreground respective background, and moreover so as to know which should be used as reference material for the subsequent image processing.

The segmentation of background areas/objects and foreground areas/objects may according to some embodiments be performed through the computation of a binary mask. This mask is typically calculated line-wise from the depth map, and is based on a search for depth discontinuities. When a positive depth discontinuity (i.e. from low to high depth, where high depth values indicate depth closer to the viewer, and low depth values depth farther away from the viewer) is encountered, the mask is set to foreground. Similarly, when a negative depth discontinuity is found, it is assumed that the foreground object is finished and the mask is set to background.

The processing for each pixel may e.g. be the following:

```
depth_jump = depth[x][y] − last_depth;
if (abs(depth_jump) > DEPTH_THRESHOLD) {
   if (depth_jump > 0) {
      on_occ_area = true;
      bg_mask[x][y] = FOREGROUND;
   }
   else {
      on_occ_area = false;
      bg_mask[x][y] = BACKGROUND;
   }
}
else {
   bg_mask[x][y] = (on_occ_area ? FOREGROUND : BACKGROUND);
}
```

A variety of edge detectors could be used to isolate the depth discontinuities, using single or multi-pass analysis of the image.

If the depth transitions are not abrupt but smooth, or if there are multiple overlapping foreground objects stacked over different layers of depth multiple parameters may be set to change the behavior of the computation of the mask. Such parameters may e.g. be marking a certain level as reference background (any pixel with such depth or lower will always be considered background, defining the threshold for considering a discontinuity a transition from background to foreground (or vice-versa), or setting a rectangular region to operate and consider the rest background.

32) Creating an Area 24

The step of creating an area 24 may be performed using regular dilation. The area 24 defines an area in which one may not trust the image or video content because this is where errors, such as compression artifacts or depth misalignment artifacts may occur.

In an embodiment the area 24 is an area in between the foreground object 23 and the background area 22, extending into the background area 22. In other words, the area 24 may be referred to as an enlargement of the foreground mask 23 defining the foreground object after foreground/background segmentation. The area 24 thus defines an area in which background is desired, and the step of performing foreground/background dependent processing 33 may comprise reconstructing background information there, utilizing background information in the background area 22 located outside area 24. Accordingly, the artifacts to be corrected are located inside the area 24. Thus, in this case the area is located outside the foreground object.

It may be observed from FIG. 2 that not only the depth is not properly aligned with the foreground object, but also the neighboring background pixels are slightly darker than expected. This is a known artifact resulting from compression. By creating the area 24 inside the background area 22, and processing, i.e. reconstructing the pixel data in the area based on background information from the background area 22 outside the area 24, the artifacts will be corrected.

The step of creating an area 24 may comprise determining how many pixels the foreground mask should be enlarged, e.g. vertically and horizontally, when the image is a 2D image.

In an embodiment the size of the area 24 is estimated given the common block sizes used for compression. Preferably this should be coding block grid aligned. Some coding standards use deblocking filters. In these cases one could opt for an area block grid aligned and dilate with one extra block grid for compensating for the deblocking artifacts.

Sources of compression artifacts are overshoot and undershoot near edges. In an embodiment, the size of the area 24 is determined by calculating the undershoot area outside the transition, i.e. the area where the image values are darker than the values outside of the area, and set the size of the area accordingly. In another embodiment parameters in the bitstream, such as the quantization parameter, may be used to determine the size of the area.

In the case the processed image is a 2D image the area 24 is created in the 2D image plane, having a vertical and a horizontal extension.

According to an embodiment, due to the smoothness of depth maps, the size of the area is determined from the depth map for each image, as this may be easier for some cases when compression is involved and the depth maps have been generated semi-automatically. As such the segmentation is human steered and therefore of high quality. Furthermore, artifacts will especially be visible at depth/disparity transitions; therefore segmentation steered by depth/disparity maps is advantageous. Since depth maps are smooth apart from object boundaries, high-frequency mosquito noise and overshoot and undershoot from compression may be easier to detect near to object boundaries in the depth/disparity maps, and the area in which such high-frequency variations are detected is indicative of the area affected by compression artifacts. The determined size of the area 24 may then be utilized for the image part.

The present inventors have realized that similar to how to ensure that the region outside the foreground object in the area contains background color by inpainting background, it is also possible to do the same on the other side of the edge: by creating the area 24 inside the foreground object, i.e. reducing the foreground mask. In this way the area 24 is located just inside the foreground object, which is likely also plagued by compression artifacts and can also have misalignments in the form of pixels with foreground depth but background color. By discarding the color information in such areas and inpainting it, extending the foreground color again to the boundary as present in the foreground mask as derived from the depth map, such artifacts may also be removed.

Accordingly, in an alternative embodiment, the area 24 may be created by reducing the foreground mask 23, and then the area 24 may be processed by the foreground/background dependent processing, e.g. by inpainting, replacing the original color using the color information from the area inside the foreground mask 23 or by blending the color from outside the area 24 based on an expected reliability thereof.

33) Foreground/Background Dependent Processing on the Pixel Data

The step of performing foreground/background dependent processing on the pixel data in area 24 is in essence an artifact reduction step. Accordingly, the step 33 of performing a foreground/background dependent processing may solve the problem of compression artifacts 26 around the objects, such as foreground objects in the image, see FIG. 4b.

In an embodiment the foreground/background dependent processing comprises inpainting on the area 24. Several inpainting techniques are possible for performing the foreground/background dependent processing.

In case the area 24 is located inside the background area 22, background color information from the background area 22 may be utilized to inpaint the pixel data in area 24.

In case the area 24 is located inside the foreground object 231, foreground color information from the foreground mask 23 may be utilized to inpaint the pixel data in area 24.

Accordingly, depending on the location of the area 24, i.e. depending on where to correct artifacts, the processing may differ, utilizing either foreground color information from the foreground mask 23 or background color information from the background mask 22, respectively. In this way the processing on the pixel data in area 24 is foreground/background dependent.

In an embodiment the inpainting technique used is a pixel repetition technique for replacing the pixels in the area 24 to process. Pixel repetition is a process in which the previous known/trusted pixel, also referred to as reconstructed data, is copied onto the unknown/un-trusted pixels, possibly along a predefined scan axis.

In an embodiment, the pixel data is replaced with another pixel data, i.e. reconstructed data, originating outside of area 24. For example, the pixel data in area 24 is reconstructed by repetition of pixel data from the background area 22. For every pixel in area 24, the value of the closest pixel in area 22 (outside 24) can be copied. This may be done along a certain direction, either pre-determined, e.g. horizontally, in this case to the right, or along a direction determined from the background area 22 to continue edges along their original direction. For a homogeneously colored background as in FIG. 2, this will already yield good results.

In another embodiment the inpainting technique used is a blending technique utilizing image information outside the area 24 to be blended or mixed, such as averaged, possibly with the actual image information in the area 24. In this way artifacts may be suppressed while still retaining some of the original texture of area 24. In such a case the reconstructed pixel data may be blended with the existing pixel data in area 24.

The blending factor, defining the ratio between the original pixel value and reconstructed pixel value, may be an a-priori determined value, in another embodiment this blending factor is derived from other data in the stream, like quantization parameter, amount of ringing measured, statistical differences between the foreground and background, etc.

In another embodiment the blending factor is a function of the distance to the edge of the inpainting area, such that pixels closer to the edge have a different blending factor than pixels further away from the edge.

In another embodiment the blending factor is derived from the reliability of the reconstruction constructed by the inpainting. Such reliability may depend on the distance of the reconstructed pixel from the trusted pixels which it is based on, but also for example on the amount of texture in the trusted area, where for example pixel repetition is known to provide unreliable extrapolation.

In an embodiment the step of inpainting is performed utilizing extrapolation, rather than commonly used interpolation.

In an embodiment, the inpainting technique is a spatial inpainting technique. Commonly, spatial inpainting techniques exclusively utilize colors from the currently processed image frame, extending the background into the area 24. Pixel repetition is an example of spatial inpainting.

In an embodiment, the step of performing inpainting comprises measuring the image characteristics of the area close to the area to inpaint and with similar depth/disparity values as those of the area to inpaint. Textures, such as edges, colors, etc may be derived and used to inpaint the area 24 comprising un-trusted pixel information.

In another embodiment, the inpainting technique is a temporal inpainting technique. Commonly, temporal inpainting techniques utilize background image information from previous and/or next frames to determine the colors in the area to be inpainted in the current frame. In order to perform temporal inpainting, it is required that a motion field, estimating movements of objects between at least two successive image frames is calculated. The motion estimation may be part of the temporal inpainting algorithm where background image information is not merely obtained from extending the background area in the current image, but by motion-compensating background information from previous or upcoming images where the image data which should be inpainted might be visible in the reliable background area. Accordingly, in this way no, or less, data has to be "made up" during the inpainting.

In an embodiment, the inpainting technique utilizes multi view camera input, such as a stereo input for the processed image frame. In this way information behind the foreground object may be identified and used during inpainting, using a disparity vector field.

In an embodiment the inpainting technique is the one disclosed in Y. Wexler et al "Space-time Video Completion". Proceedings of the 2004 IEEE Computer Society Conference on Computer Vision and Pattern Recognition (CVPR 2004), 1, 2004.

In case of image sequences, motion/disparity estimation, henceforth referred to as motion estimation, may be performed on the processed images in order to calculate a motion/disparity vector field, henceforth referred to as motion vector field. In its simplest form motion estimation pertains to the analysis of two images to compute a vector field, which represents the estimated movement between the two images. Initially used for motion compensated coding, it has since then been used for various means, such as interpolation for video format conversion, de-interlacing and depth estimation from stereo.

In an embodiment, the foreground/background dependent processing comprises applying a deranging filter. Characteristics of image data typically change from one object to the other. This is also the cause of extra coding artifacts at transitions form one object to the other. So having filters that filter just inside the object may be designed differently, to yield a better image quality. Such filters are commonly known as deranging filters.

Correction of Depth Misalignment 34

The method according to some embodiment may also be configured to at least partially solve the problem of depth misalignment 25. In this case the method comprises:

altering 34 the image information in the area 24 for correction of the depth misalignment 25 in the area 24. In area 24 there may be combinations of background depth and foreground color. Since the color is regenerated as an extension of background color, after processing, the mismatch is gone, since there is now background color and background depth again. This will result in replacing the information in the problem area with new, inpainted background material, therefore removing the incorrect foreground information with background depth. The present inventors are of the opinion that the quality of the result will not be deteriorated by replacing this part of foreground with inpainted background even though the misalignment in the depth mask will cause the reconstruction to discard foreground object information, since such misalignment was already causing visible artifacts by projecting foreground material with incorrect background depth, hence the quality of the input was already low.

Accordingly, depending on the location and size of the area 25 depth misalignment artifacts and compression artifacts may be corrected utilizing the method according to some embodiments.

Figure 1A:
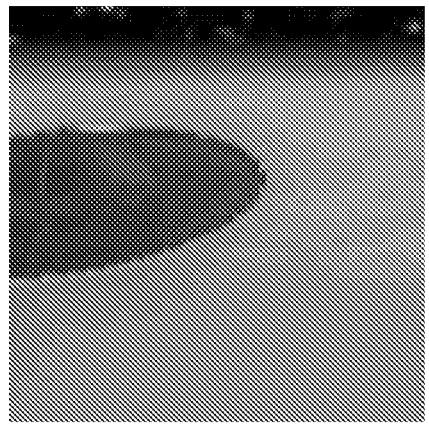
FIGS. 1a and 1b illustrates images showing image quality issues pertaining to depth alignment respective compression of an image or video utilizing commonly known lossy video compression schemes.
Figure 4A:
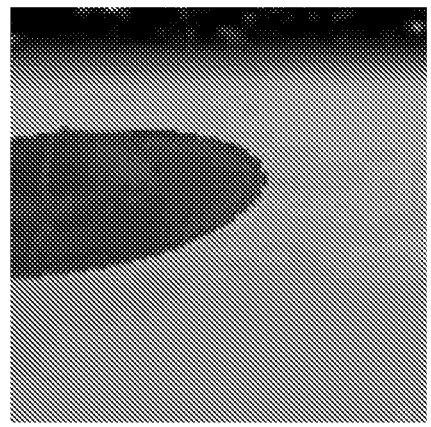
FIG. 4a corresponds to FIG. 1a being processed by the method according to an embodiment.

FIG. 4*a* illustrates the image of FIG. 1*a* being processed by the method according to an embodiment, and it may be observed that the artifacts clearly shown in FIG. 1 have been corrected by processing the image using the method. As may be observed from FIG. 4*a* the depth misalignment is corrected (depth component overlaid over luminance).

Figure 1B:
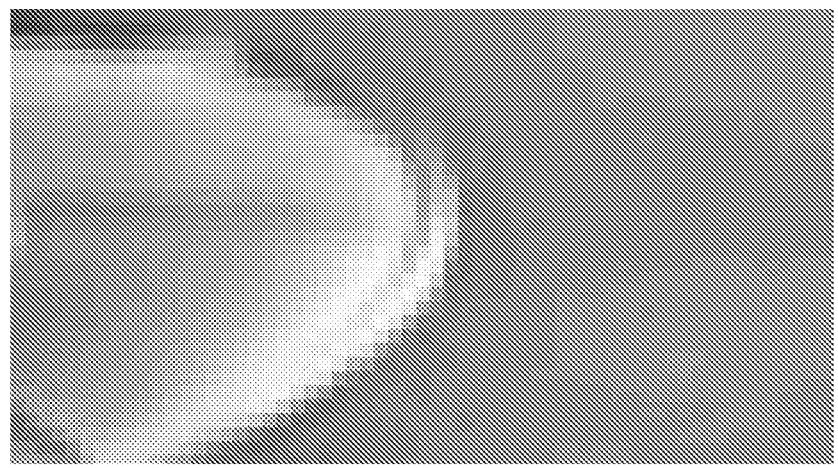
Figure 4B:
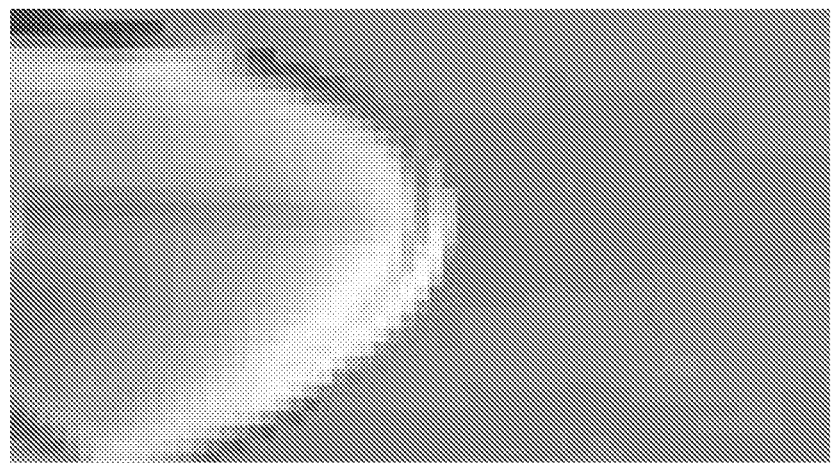
FIG. 4b corresponds to FIG. 1a being processed by the method according to an embodiment.

FIG. 4*b* illustrates the image of FIG. 1*b* being processed by the method according to an embodiment. As may be observed from FIG. 4*b* the compression artifacts, such as halos around the foreground object in the image, have been corrected.

Figure 5:
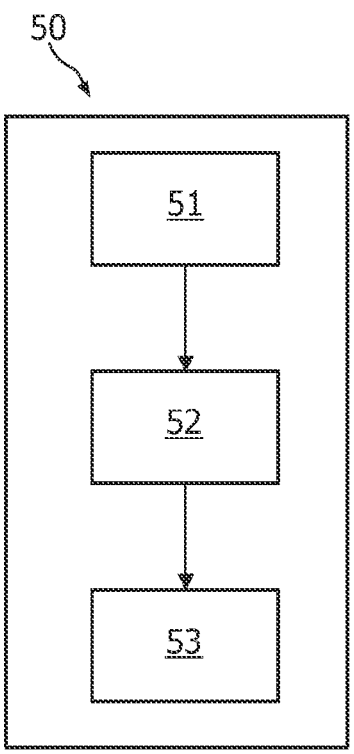
FIG. 5 is a block scheme showing a processing unit according to an embodiment.

In an embodiment, according to FIG. 5, a processing unit 50 is provided. The processing unit is configured to:

perform 51 foreground/background segmentation on an image comprised in said image signal based on the depth or disparity component of said image signal, resulting in a foreground mask 23 and a background mask 22, create 52 an area 24 adjacent to a segmentation transition in said segmented image, wherein the area 24 comprises artifacts 26, and perform 53 foreground/background dependent processing on the pixel data in the area 24, resulting in a processed image.

In an embodiment the processing unit comprises one or more dedicated units for performing any step of the method according to some embodiments.

In an embodiment the processing unit is implemented in a set top box (STB), a video decoder, or as a module within e.g. an autostereoscopic display that converts content from 2D to 3D.

The image-processing unit may be any unit normally used for performing the involved tasks, e.g. a hardware, such as a processor with a memory. The processor may be any of variety of processors, such as Intel or AMD processors, CPUs, microprocessors, Programmable Intelligent Computer (PIC) microcontrollers, Digital Signal Processors (DSP), etc. However, the scope of the invention is not limited to these specific processors. In fact the present invention can be implemented using programmable processing platforms or circuits, as well as purpose built processing platforms or circuits such as ASICs.

Figure 6:
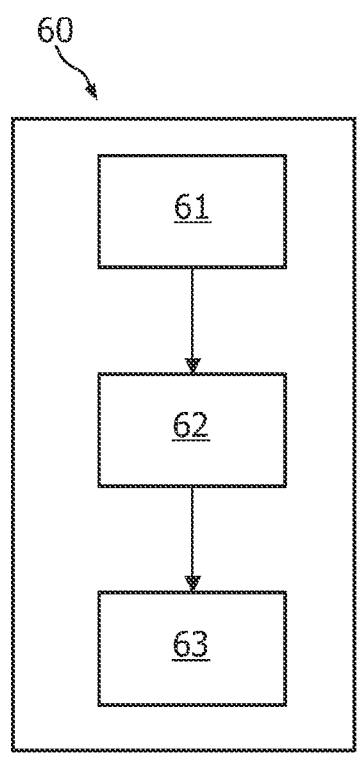
FIG. 6 illustrates a computer program product according to an embodiment.

In an embodiment, according to FIG. 6, a computer program product 60 is provided. The computer program product may be stored on a computer readable medium and comprising a computer program for processing by a processor. The computer program comprises a first code segment 61 for performing 31 foreground/background segmentation on an image comprised in said image signal based on the depth or disparity component of said image signal, resulting in a foreground mask 23 and a background mask 22, a second code segment 62 for creating 32 an area 24 adjacent to a segmentation transition in said segmented image, wherein the area 24 comprises artifacts 26, and a third code segment 63 for performing 33 foreground/background dependent processing on the pixel data in the area 24, resulting in a processed image.

In an embodiment the computer-readable medium comprises code segments arranged, when run by an apparatus having computer-processing properties, for performing all of the method steps defined in some embodiments.

In an embodiment the computer-readable medium comprises code segments arranged, when run by an apparatus having computer-processing properties, for performing all of the method steps defined in some embodiments.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for operating an image processor unit for processing an image signal comprising image and depth information, the method comprising the acts of:

in an image processor unit, a processor executing code segments stored in a memory for performing the acts of:

determining and storing in the memory, image and depth information for an image determined from an image signal, performing foreground/background segmentation on the image based on the depth or disparity component of the image signal, for determining a foreground mask and a background mask for the image, determining an area around a segmentation transition in the segmented image, wherein the area comprises artifacts, determining a location of the artifacts with regard to the foreground mask and the background mask, wherein the location of the artifacts within the area is determined as high-frequency variation of pixel data caused by compression;

extending the area into one of the foreground mask and the background mask, based on the location of the artifacts, and performing one of foreground dependent and background dependent processing on pixel data in the extended area, resulting in a processed image, the dependent processing comprising:

adjusting color information inside the extended area to a boundary of the foreground mask.

2. The method according to claim 1, wherein the dependent processing is one of: an inpainting technique of temporal inpainting, spatial inpainting, and a spatio-temporal inpainting.

3. The method according to claim 1, the adjusting color information comprising:

replacing said pixel data in the extended area with pixel data outside the extended area.

4. The method according to claim 1, said adjusting color information comprising:

blending said pixel data in the extended area with pixel data located outside the extended area.

5. The method according to claim 4, wherein the blending factor is a function of a distance to the segmentation transition of the extended area.

6. The method according to claim 1, wherein said adjusting color information comprising:

changing said pixel data in the extended area based on pixel data originating from stereo or multiview image pairs.

7. The method according to claim 1, wherein said adjusting color information is performed by utilizing foreground color information from the foreground mask to inpaint the pixel data in the extended area.

8. The method according to claim 1, wherein said adjusting color information is performed by utilizing background color information from the background mask to inpaint the pixel data in area.

9. The method according to claim 1, wherein said area is derived from data in the bitstream.

10. The method according to claim 9, wherein said data is a block size used for compression.

11. The method according to claim 9, wherein said data is a quantization parameter.

12. The method according to claim 9, wherein said data is a de-blocking filter setting.

13. A processing unit processing an image signal comprising image and depth information, comprising:

a memory; and a processor in communication with the memory, the memory being configured to control the processor to:

perform foreground/background segmentation on an image comprised in the image signal based on the depth or disparity component of the image signal, for defining a foreground mask and a background mask, determine an area adjacent to a segmentation transition in the segmented image, wherein the area comprises artifacts, determine a location of the artifacts with regard to the foreground mask and the background mask, wherein the location of the artifacts within the area is determined as high-frequency variation of pixel data caused by compression;

extend the area into one of the foreground mask and the background mask, based on the location of the artifacts, and perform one of foreground dependent and background dependent processing on pixel data in the extended area, resulting in a processed image, the dependent processing comprising adjusting color information inside the extended area to a boundary of the foreground mask.

14. A computer program product stored on a non-transitory computer-readable medium comprising software code which when executed on a data-processing apparatus performs the acts of:

in an image processor unit, a processor executing code segments stored in a memory for performing the acts of:

determining and storing in the memory, image and depth information for an image determined from an image signal, performing foreground/background segmentation on an image comprised in the image signal based on the depth or disparity component of the image signal, resulting in a foreground mask and a background mask;

creating an area around a segmentation transition in the segmented image, wherein the area comprises artifacts, determining a location of the artifacts with regard to the foreground mask and the background mask, wherein the location of the artifacts within the area is determined as high-frequency variation of pixel data caused by compression;

extending the area into one of the foreground mask and the background mask, based on the location of the artifacts, and performing one of foreground dependent and background dependent processing on pixel data in the extended area, the dependent processing comprising adjusting color information inside the extended area to a boundary of the foreground mask.

15. The processing unit according to claim 13 wherein the dependent processing is one of: an inpainting technique of temporal inpainting, spatial inpainting, and a spatio-temporal inpainting.

16. The processing unit according to claim 13 the adjusting color information comprising:
replacing said pixel data in the extended area with pixel data outside the extended area.

17. The processing unit according to claim 13 said adjusting color information comprising:
blending said pixel data in the extended area with pixel data located outside the extended area.

18. The processing unit according to claim 17, wherein the blending factor is a function of a distance to the segmentation transition of the extended area.

19. The processing unit according to claim 13 wherein said adjusting color information comprising:
changing said pixel data in the extended area based on pixel data originating from stereo or multiview image pairs.

20. The processing unit according to claim 13 wherein said adjusting color information is performed by utilizing foreground color information from the foreground mask to inpaint the pixel data in the extended area.

21. The processing unit according to claim 13 wherein said adjusting color information is performed by utilizing background color information from the background mask to inpaint the pixel data in area.

22. The processing unit according to claim 13 wherein said area is derived from data in the bitstream.

23. The processing unit according to claim 22, wherein said data is a block size used for compression.

24. The processing unit according to claim 22, wherein said data is a quantization parameter.

25. The processing unit according to claim 22, wherein said data is a de-blocking filter setting.

* * * * *